July 24, 1928.　　　　　J. O. BERGMAN　　　　　1,678,032
CONSOLE RADIOCABINET
Filed April 9, 1926　　　2 Sheets-Sheet 1

Inventor
Johan O. Bergman
By Wilson & McCanna
Attys.

July 24, 1928.  
J. O. BERGMAN  
CONSOLE RADIOCABINET  
Filed April 9, 1926    2 Sheets-Sheet 2

1,678,032

Inventor:
Johan O. Bergman
By Wilson & McCanna
Attys.

Patented July 24, 1928.

1,678,032

UNITED STATES PATENT OFFICE.

JOHAN O. BERGMAN, OF ROCKFORD, ILLINOIS, ASSIGNOR TO ROCKFORD NOVELTY FURNITURE COMPANY, OF ROCKFORD, ILLINOIS, A CORPORATION OF ILLINOIS.

CONSOLE RADIOCABINET.

Application filed April 9, 1926. Serial No. 100,781.

This invention relates to radio cabinets generally but is more particularly concerned with the provision of a console type cabinet embodying certain novel and advantageous features and presenting a striking similarity to the cabinet of a baby grand piano.

The principal object is to provide a console cabinet of the kind mentioned having a front instrument compartment and a rear horn and battery storage compartment, the latter having the vertical side walls thereof converging rearwardly to simulate the harp shape of a baby grand piano and also enable the placing of the cabinet to advantage in the corner of a room with the instrument compartment diagonally disposed and the storage compartment utilizing the space therebehind.

Another object is to provide a cabinet of this kind having a relatively shallow front compartment to contain the instruments and a relatively deep compartment therebehind having a front wall projecting above the front compartment at the back thereof provided with a grilled opening behind which a horn disposed in the rear compartment may be arranged, the horn furthermore being preferably mounted on a hinged lid to be swung into and out of the compartment so as to afford access to the storage space therebeneath.

Still other features of the cabinet are the provision of a hinged lid for the front compartment affording ready access to the instruments and a hinged fall for the front of said compartment to expose the radio panel therebehind and to provide a convenient and comfortable arm rest while using the radio.

The invention is illustrated in the accompanying drawings, wherein—

Fig. 1 is a plan view of a cabinet embodying the novel features referred to;

Figure 2:
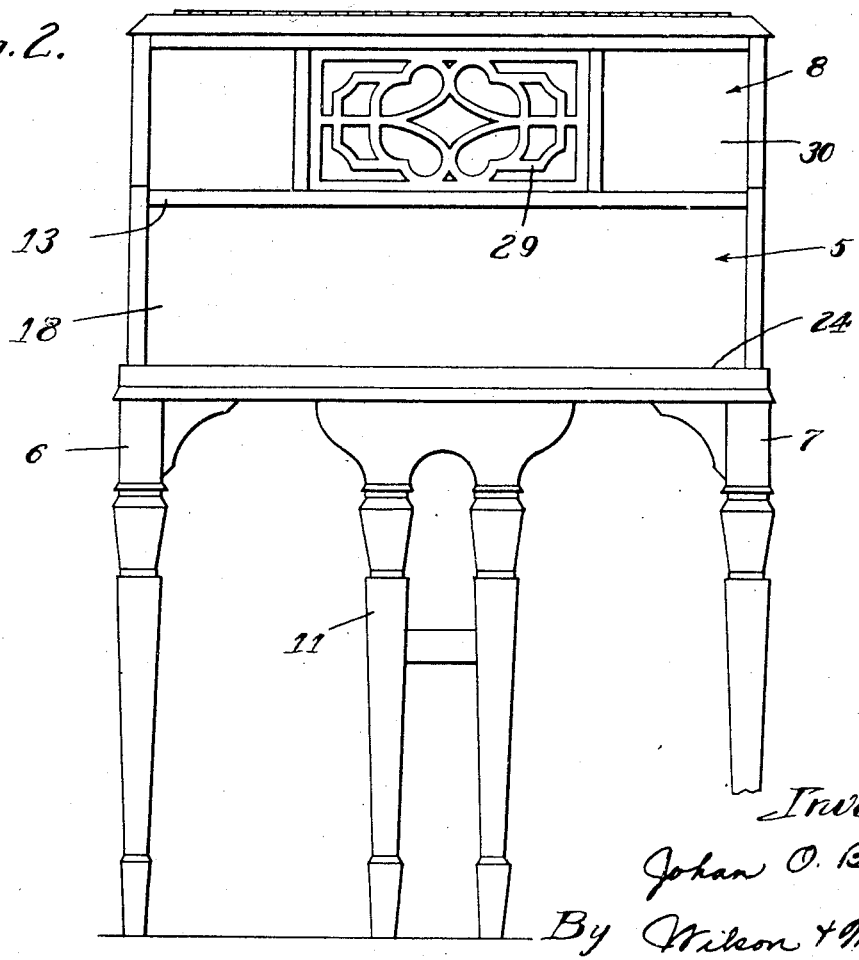
Fig. 2 is a front view thereof.
Figure 3:
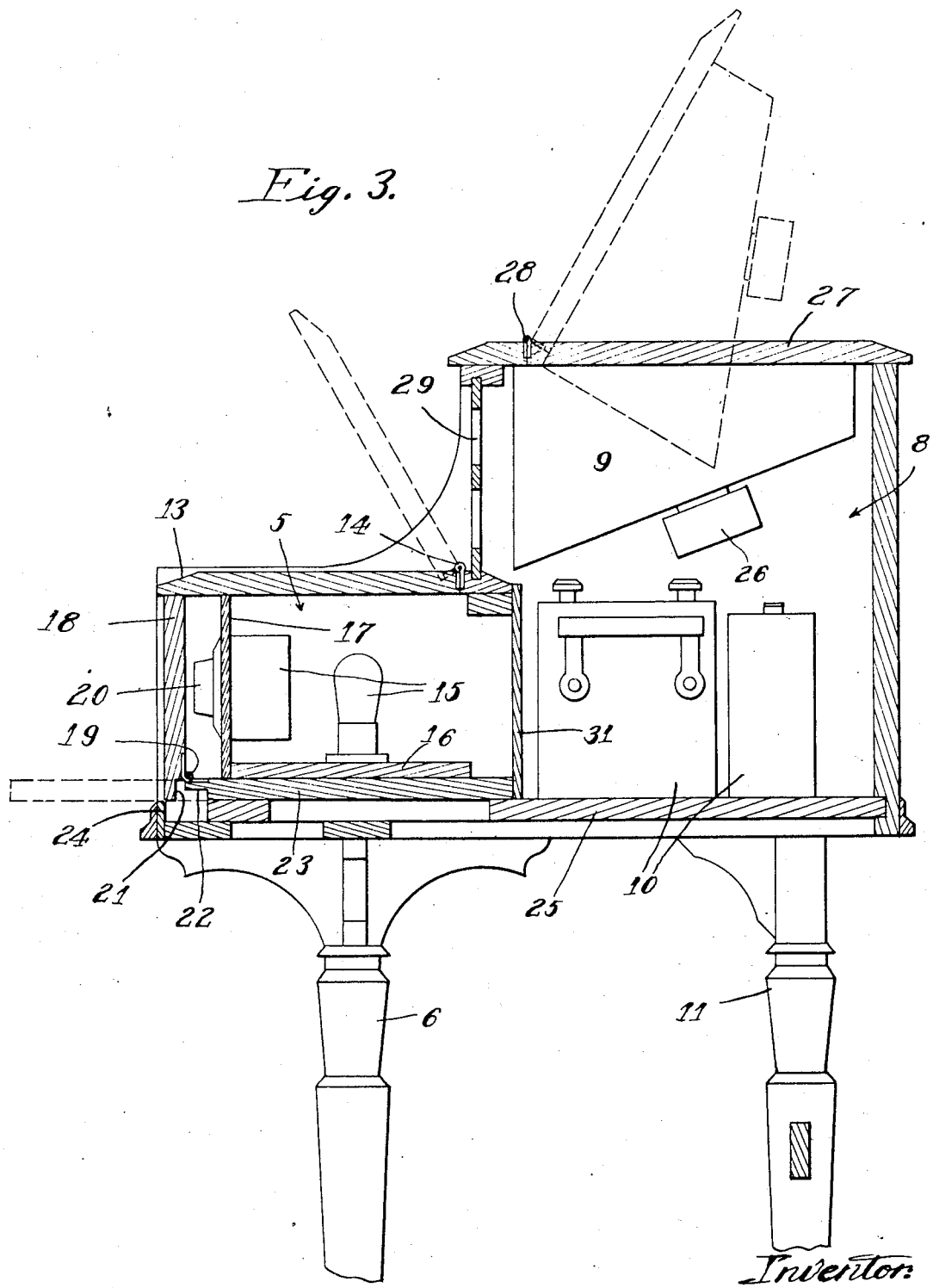
Fig. 3 is an enlarged central vertical section therethrough indicating in dotted lines how the front fall may be lowered and the two lids raised, the one lid carrying the horn with it out of the cabinet in a manner briefly referred to above and more fully described hereinafter.

The cabinet of the present invention is of the console type and is designed to present a striking resemblance generally to a baby grand piano. Thus, generally stated, the cabinet embodies a front instrument compartment 5 extending the width of the cabinet and supported by laterally spaced front legs 6 and 7, thereby simulating the front of a baby grand piano with the closed compartment 5, resembling the closed keyboard. Behind the instrument compartment 5 which, it will be noted, is relatively shallow so as better to carry out the impression of the keyboard portion of the piano, is a relatively deep storage compartment 8 which serves to house the loud speaker horn 9 and also to store the A and B batteries 10. A rear double leg 11 underlies the rear compartment 8, as shown, and in front elevation, furthers the resemblance to the baby grand piano, as will be clear from Fig. 2. The rear compartment 8 has rearwardly converging vertical side walls 12 to simulate the harp shaped sound box portion of a baby grand piano. The side walls 12 extend approximately at right angles so that the cabinet is particularly well adapted and, in fact, is intended for standing in the corner of the room, with the front disposed diagonally relative thereto. Thus, the storage compartment utilizes the space which would otherwise be wasted and the cabinet, besides having a generally improved appearance, is better adapted for use in the home or in apartments where the use of space to good advantage is particularly desirable.

The front compartment 5 has a lid 13 hinged at 14 to be raised, as indicated in dotted lines, so as to afford access to the instruments such as those diagrammatically represented at 15. These are preferably mounted on a base 16 and panel 17 which may or may not be removably mounted within the compartment 5, as desired. A fall 18 at the front of the compartment is hinged, as at 19, near the bottom thereof to be lowered to the dotted line position shown and thus expose the dials 20 on the panel 17. The fall 18 has a rabbeted lower edge, as shown at 21, arranged in the lowered position of the fall to underlie the ledge 22 afforded by the rabbeted front edge of the bottom 23 of the compartment 5. This serves to support the fall which is intended to serve as an arm rest while adjusting the dials and as a convenient place to make notes of the setting of dials etc. The fall is also supported in its lowered position by a crosspiece 24 which normally lies flush with the bottom of the fall at the front thereof giving a neat, trim appearance with the fall in its opened or closed position. Suitable detents, such as spring-pressed elements, may be provided on the fall 18 to retain it in its closed position although it will be observed that the lid 13 accomplishes this purpose to a certain extent. The latter is also preferably provided with spring-pressed detents at opposite ends thereof to keep the same normally tightly closed so as to maintain the good appearance of the cabinet.

Figure 1:
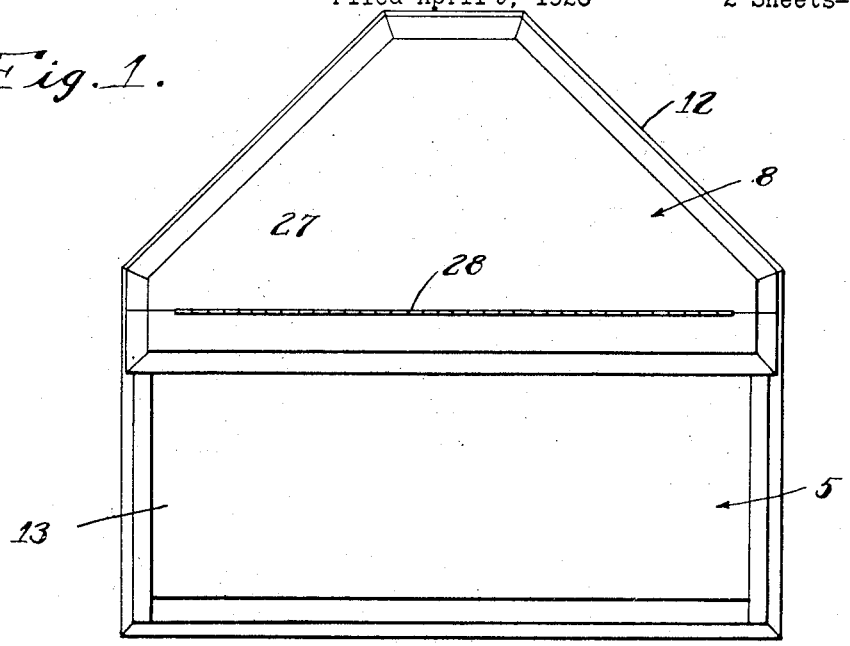

The rear compartment 8 has a relatively heavy bottom 25 to sustain the weight of the batteries 10, it being noted that the concentrating of the support at this point in the closely spaced double leg 11 is also of particular advantage for the same purpose. The depth of the compartment enables disposing the loud speaker horn 9 therein over the batteries, as shown. The horn 9, in common with other devices of this kind, has rearwardly converging side and bottom walls which particularly adapt it to installation in the compartment 8 which, it will appear in Fig. 1, is generally triangular in horizontal section. The upward inclination of the bottom wall leaves a space therebeneath for the speaker unit 26 which is preferably mounted directly on the horn, the horn being preferably of the construction shown in my copending application, Serial No. 100,782 filed April 9, 1926, wherein the speaker unit is mounted substantially as shown herein.

The horn is preferably mounted directly on the under side of the lid 27 to swing into and out of the compartment and thus afford ready access to the batteries when they require servicing or must be removed and replaced. The lid 27 is hinged, as at 28, to raise in the direction indicated in dotted lines. The horn 9 terminates adjacent an ornamental grill 29 provided in an opening in the front wall 30 which rises from the top of the front compartment 5 at the rear thereof. Thus, the sound is transmitted forwardly over the front compartment which, of course, is desirable. A partition wall 31 is preferably provided between the compartments 5 and 8.

It is believed that the foregoing description conveys a clear understanding of the invention and of its purposes and advantages so that anyone skilled in the art to which the invention relates will appreciate the possible modifications thereof, all of which it is the purpose to cover in the appended claims.

I claim:

1. In a radio cabinet providing a front instrument compartment and a triangular rear battery storage compartment, said rear compartment being taller than said front compartment and having a front wall projecting above the latter crosswise of the back thereof provided with a grilled opening, a generally triangular lid for said rear compartment hinged adjacent the upper end of said front wall, and an amplifier horn mounted thereon on the under side thereof terminating adjacent said opening in its normal position, said horn being generally triangular in outline to fit within said rear compartment and permit swinging movement thereof with said lid out of said rear compartment while leaving a storage space therebeneath within said compartment in its normal position.

2. A radio cabinet comprising a base, a cabinet thereon providing a shallow front radio instrument compartment extending widthwise thereof, and a relatively deep rear compartment therebehind for battery and other storage purposes having a front wall projecting above said front compartment at the rear thereof provided with a grilled opening, a lid for said rear compartment, and a horn mounted on said lid to swing into and out of said compartment and normally terminating adjacent said grilled opening.

In witness of the foregoing I affix my signature.

JOHAN O. BERGMAN.